Patented Dec. 31, 1935

2,026,217

UNITED STATES PATENT OFFICE 2,026,217

PROCESS FOR BREAKING PETROLEUM EMULSIONS

Melvin De Groote, St. Louis, and Bernhard Keiser, Webster Groves, Mo., assignors to Tretolite Company, Webster Groves, Mo., a corporation of Missouri No Drawing. Application June 25, 1934, Serial No. 732,304

8 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of our invention is to provide a novel, inexpensive and efficient process for separating emulsions of the kind referred to into their component parts of oil and water or brine.

Briefly described, our process consists in subjecting a petroleum emulsion of the water-in-oil type, to the action of a treating agent or demulsifying agent of a particular kind or composition hereinafter described, thereby causing the emulsion to break down and separate into its component parts of oil and water or brine, when the emulsion is permitted to remain in a quiescent state after such treatment, or equivalent separatory procedure.

The treating agent or demulsifying agent used in our process consists of a fatty acid body in which a hydroxylated, non-sulfo aromatic residue is attached directly to the hydrocarbon radical of the fatty acid body.

The demulsifying agent may be in the form of an acid, in the form of a salt, or in the form of an ester.

A fatty acid may be indicated by the formula R.COOH, in which R is the fatty acid hydrocarbon radical or residue, and COOH is the conventional carboxyl radical. R.COOH may represent oleic acid. R is referred to as a hydrocarbon radical or residue, notwithstanding the fact that in the case of ricinoleic acid or a similar oxy acid, there may be present an oxygen atom, but since the purpose is to differentiate from the carboxyl radical, the use of the term "hydrocarbon radical residue" to include oxy fatty acid radicals or residues does not cause confusion and the expression "hydrocarbon radical or residue" is herein employed in the broad sense specified.

If a fatty acid is denoted by the formula R.COOH, then a reagent of the kind contemplated in the present process may be indicated by the formula (R'.T.OH) COOH, in which R' is a fatty acid hydrocarbon radical or residue derived from a fatty acid or a fatty acid glyceride, T is an aromatic residue attached directly to R', OH is the conventional hydroxyl radical attached to the aromatic residue T, and COOH is the conventional carboxyl radical.

If an ester or a salt is employed instead of an acid, then the acidic hydrogen of the carboxyl group is replaced by a metallic atom, such as sodium, or an organic radical such as an ethyl radical, and the previous formula may be re-written (R'.T.OH) COO.Z, in which the symbols have their previous significance, and Z is a metallic ion equivalent, such as an acidic hydrogen atom in the case of an acid itself, or a metallic atom in case of a salt, or an organic radical in case of an ester. The reagents employed in our process may be prepared in any suitable manner, and particularly by either of the following two procedures. One method is to prepare a somewhat similar derivative which is characterized by the presence of a sulfonic acid radical, and desulfonate the previously prepared product. A second method is to produce the reagent contemplated for use in the present process by reaction involving an acidic hydroxylated aromatic body and an hydroxy fatty acid such as ricinoleic acid or hydroxystearic acid.

It is well known that an aromatic body, and especially an hydroxylated aromatic body, such as phenol, may be reacted with an unsaturated fatty acid such as oleic acid in presence of an excess of sulfuric acid to produce an hydroxylated sulfonated fatty acid of the type commonly referred to as a Twitchell reagent. If such a Twitchell reagent is prepared from phenol and oleic acid by means of sulfuric acid, the product thus obtained is one corresponding to the substitution of a sulfo phenol radical in stearic acid, because the method of manufacture results in the saturated fatty acid, due to a hydrogen atom and a sulfo aromatic radical replacing the ethylene linkage of oleic acid. This product is sometimes referred to as sulfophenol stearic acid and its composition may be indicated by the formula $C_6H_4.OH.HSO_3.C_{17}H_{34}COOH$. In this particular chemical compound the aromatic residue is attached directly to the fatty hydrocarbon residue $C_{17}H_{34}$, and it is not attached to the carboxyl group COOH. This reagent sulfophenol stearic acid is not contemplated for use as a reagent in the present process, because it is a sulfonated chemical compound and reagents of the kind employed in the present process are limited to non-sulfo compounds. If sulfophenol stearic acid freed from any substantial quantity of accompanying fatty material, free sulfuric acid, and phenol sulfonic acid is treated with syrupy phosphoric acid, for several hours at approximately 150° C., desulfonation takes place and the resultant product represents phenol stearic acid, which is a suitable reagent for use in the present process. Phenol may be replaced by any other suitable aromatic hydroxy body, such as cresol, beta naphthol, etc. The oleic acid may be replaced by any other suitable reactive fatty acid, such as ricinoleic acid, or it may be replaced by a suitable glyceride, such as castor oil, olive oil, cotton seed oil, and kindred materials. The reagent employed in the present process may be produced from a hydroxylated fatty body, such as castor oil, hydroxystearic acid, ricinoleic acid and the like by reaction with salicylic acid or any suitable hydroxylated aromatic carboxy acid. It is convenient to prepare our reagent by reaction of one mol. of salicylic acid with one mol. of triricinolein, so as to produce salicylyl triricinolein, or with recinoleic acid to produce salicylyl ricinoleic acid.

The hydroxylated fatty acid obtained in any suitable manner may be used as such, or after neutralization with any suitable alkali or basic material such as caustic soda, caustic potash, strong ammonia water, sodium bicarbonate, potassium carbonate, ammonium carbonate, triethanolamine, or any other amine having basic properties, etc. Such a non-sulfo aromatic fatty acid may be converted into an aliphatic aromatic or cyclic ester by any one of the conventional methods. The ethyl, propyl, or butyl esters may be employed. The esters thus formed may be water-soluble or oil soluble. A water soluble salt of a hydroxylated non-sulfo aromatic, fatty acid, such as the sodium salt, may be reacted with a water-soluble metallic salt, such as ferrous sulfate, ferric chloride, copper sulfate, or the like, to produce a water-insoluble salt. For convenience the amine and ammonium compounds are considered as being the equivalent of metallic salts. The expression "hydroxylated non-sulfo aromatic fatty acid body" is here employed to mean the acids themselves, or the salts or esters derived therefrom. The agent may be used in a water-soluble form, or in a form exhibiting both oil and water solubility. Indeed, it may be used in a form which would ordinarily be considered both oil and water insoluble. This paradoxical statement is true because in some instances as little as one part of the hydroxylated non-sulfo aromatic fatty acid body may be used after mixture with 10,000 parts of emulsion, or even less, with the result that the stability of the emulsion is destroyed. It is true that materials frequently referred to as insoluble may be really soluble in such limited amounts, i. e., one part in 10,000.

In practicing our process the above mentioned materials may be employed alone or in combination with other recognized demulsifying agents such as water softeners, modified fatty acids, salts of petroleum sulfonic acids, naphthenic acids or salts thereof, alkylated aromatic sulfonic acids or salts thereof, derivatives of polybasic acids or salts thereof, or the like. These sulfonated dipolymer bodies, either alone or mixed with other conventional demulsifying agents, may be used after mixture with any suitable solvent, such as water, ethyl alcohol, methyl alcohol, denatured alcohol, propyl alcohol, butyl alcohol, cresylic acid, benzol, solvent naphtha, toluene, hard wood tar oil, creosote oil, anthracene oil, pine oil, turpentine, dipentene, pine tar oil, cymene, spruce turpentine, rosin oil, kerosene, hydrogenated naphthalene, sulfur dioxide extract derived from petroleum distillates, carbon tetrachloride, various chlorinated hydrocarbons, pine oil creosote, and the like.

Our preferred reagent or demulsifying agent consists of the triethanolamine salt of phenol stearic acid. Sulfophenol stearic acid is prepared by reaction of oleic acid and phenol in presence of an excess of sulfuric acid. The sulfonated mass produced by such reaction is washed to remove the excess of sulfuric acid, any unreacted phenol and any phenol sulfonic acid which may be present. The remaining material consisting largely of sulfophenol stearic acid and non-sulfo fatty bodies, such as hydroxystearic acid and unreacted oleic acid, is mixed with water and extracted with petroleum ether, so as to remove the non-sulfo fatty bodies. Subsequently, the petroleum ether layer, after extraction of the fatty material, is removed, and the ether recovered for future use. The concentrated solution of sulfophenol stearic acid need not be evaporated, but may be acidified with a fairly high proportion of syrupy phosphoric acid. For instance, an amount of phosphoric acid equal to half the weight of the sulfophenol stearic acid present may be employed. This acidified concentrated solution is treated in an autoclave under pressure of approximately 150 to 200° C. until desulfonation is substantially complete. The lower acid layer is withdrawn and the upper water insoluble fatty layer is washed to remove small remaining amounts of inorganic acids. The dilute wash water is withdrawn, the fatty material is then neutralized with triethanolamine of commercial purity until the product becomes bright and transparent and shows suitable water miscibility.

In practicing our process, a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

The amount of treating agent that may be required to break the emulsion may vary from approximately 1 part of treating agent to 500 parts of emulsion, up to 1 part of treating agent to 20,000 or even 30,000 parts of emulsion. The proportion depends on the type of emulsion being treated, and also upon the equipment being used, and the temperature employed. In treating exceptionally refractory emulsions of the kind known as "tank bottoms", and "residual pit oils", the ratio of 1:500, above referred to, may be required. In treating fresh emulsions, i. e., emulsions that will yield readily to the action of chemical demulsifying agents, the ratio of 1:30,000, above referred to, may be sufficient to produce highly satisfactory results.

In general, we have found that for an average petroleum emulsion, a ratio of 1 part of treating agent to 10,000 parts of emulsion will usually be found to produce commercially satisfactory results.

Having thus described our invention, what we now claim and desire to secure by Letters Patent is:

1. A process for breaking petroleum emulsions of the water-in-oil type, which consists in subjecting the emulsion to a demulsifying agent containing a hydroxylated, non-sulfo fatty acid body of the type (R'.T.OH) COO.Z, in which R' is a fatty acid hydrocarbon residue derived from a fatty acid or its glyceride, T is an aromatic residue attached directly to R', OH is the conventional hydroxyl radical attached directly to T, COO is the conventional carboxyl radical residue, and Z is a hydrogen ion equivalent.

2. A process for braking petroleum emulsions of the water-in-oil type, which consists in subjecting the emulsion to a demulsifying agent containing a hydroxylated, non-sulfo fatty acid body of the type (R'.T.OH) COO.Z, in which R' is a fatty acid hydrocarbon residue derived from a fatty acid or its glyceride, T is an aromatic residue attached directly to R', OH is the conventional hydroxyl radical attached directly to T, COO is the conventional carboxyl radical residue, and Z is a metallic atom.

3. A process for breaking petroleum emulsions of the water-in-oil type, which consists in subjecting the emulsion to a demulsifying agent containing a hydoxylated, non-sulfo fatty acid body of the type (R'.T.OH) COO.Z, in which R' is a fatty acid hydrocarbon residue derived from oleic acid or its glyceride, T is an aromatic residue attached directly to R', OH is the conventional hydroxyl radical attached directly to T, COO is the conventional carboxyl radical residue, and Z is a metallic atom.

4. A process for breaking petroleum emulsions of the water-in-oil type, which consists in subjecting the emulsion to a demulsifying agent containing a hydroxylated, non-sulfo fatty acid body of the type (R'.T.OH) COO.Z, in which R' is a fatty acid hydrocarbon residue derived from oleic acid or its glyceride, T is a monocyclic aromatic residue attached directly to R', OH is the conventional hydroxyl radical attached directly to T, COO is the conventional carboxyl radical residue, and Z is a metallic atom.

5. A process for breaking petroleum emulsions of the water-in-oil type, which consists in subjecting the emulsion to a water-soluble demulsifying agent containing a hydroxylated, non-sulfo fatty acid body of the type (R'. T. OH) COO.Z, in which R' is a fatty acid hydrocarbon residue derived from oleic acid or its glyceride, T is a $C_6H_4$ radical attached directly to R', OH is the conventional hydroxyl radical attached directly to T, COO is the conventional carboxyl radical residue, and Z is a metallic atom.

6. A process for breaking petroleum emulsions of the water-in-oil-type, which consists in subjecting the emulsion to a demulsifying agent containing a hydroxylated, non-sulfo fatty acid body of the type (R'.T.OH) COO.Z, in which R' is a fatty acid hydrocarbon residue derived from a fatty acid or its glyceride, T is an aromatic residue attached directly to R', OH is the conventional hydroxyl radical attached directly to T, COO is the conventional carboxyl radical residue, and Z is an acidic hydrogen atom.

7. A process for breaking petroleum emulsions of the water-in-oil type, which consists in subjecting the emulsion to a demulsifying agent containing a hydroxylated, non-sulfo fatty acid body of the type (R'.T.OH) COO.Z, in which R' is a fatty acid hydrocarbon residue derived from a fatty acid or its glyceride, T is an aromatic residue attached directly to R', OH is the conventional hydroxyl radical attached directly to T, COO is the conventional carboxyl radical residue, and Z is an organic radical.

8. A process for breaking petroleum emulsions of the water-in-oil type, which consists in subjecting the emulsion to a water-soluble demulsifying agent containing an hydroxylated, non-sulfo fatty acid body of the type (R'.T.OH) COO.Z, in which R' is a fatty acid hydrocarbon residue derived from oleic acid or its glyceride, T is a $C_6H_4$ radical attached directly to R', OH is the conventional hydroxyl radical attached directly to T, COO is the conventional carboxyl radical residue, and Z is a triethanolamine residue.

MELVIN DE GROOTE.
BERNHARD KEISER.